United States Patent
Seefeldt et al.

(10) Patent No.: US 7,490,879 B2
(45) Date of Patent: Feb. 17, 2009

(54) PINE CONE COLLECTION TOOL

(75) Inventors: Douglas Seefeldt, Corpus Christie, TX (US); Debra Seefeldt, 15818 Cuttysark, Corpus Christie, TX (US) 74818-6467; Milton Seefeldt, Silverton, OR (US); Jeff Bendio, Spokane Valley, WA (US)

(73) Assignee: Debra Seefeldt, Corpus Christi, TX (US), by said Jeff Bendis, by said Milton Seefeldt and by said Douglas Seefeldt ( * ) Notice: Subject to any disclaimer, the term of this patent is extended or adjusted under 35 U.S.C. 154(b) by 248 days.

(21) Appl. No.: 11/452,796

(22) Filed: Jun. 14, 2006

(65) Prior Publication Data
US 2006/0230736 A1 Oct. 19, 2006

Related U.S. Application Data

(63) Continuation-in-part of application No. 10/826,629, filed on Apr. 15, 2004, now abandoned.

(51) Int. Cl.
*A47F 13/06* (2006.01)
(52) U.S. Cl. ............................ 294/19.1; 294/19.2
(58) Field of Classification Search ............... 294/19.1, 294/19.2; 56/126, 332, 328.1; 171/11, 14, 171/50, 63
See application file for complete search history.

(56) References Cited

U.S. PATENT DOCUMENTS

| 4,964,665 | A | * | 10/1990 | Crow | 294/19.2 |
| 6,398,278 | B1 | * | 6/2002 | Orr | 294/1.4 |
| 6,619,022 | B2 | * | 9/2003 | Edwards | 56/328.1 |
| 2001/0018822 | A1 | * | 9/2001 | Blyth | 56/328.1 |

OTHER PUBLICATIONS

Definition of "flat" from thefreedictionary.com/flat.*

* cited by examiner

*Primary Examiner*—Michael S Lowe
(74) *Attorney, Agent, or Firm*—G. Turner Moller

(57) ABSTRACT

A collection tool that allows retrieval and storage of pine cones by a user while maintaining an erect posture. The tool provides an elongate tubular body having manipulative handles at its upper end portion and first connecting means to attach entry structure at its lower end portion. The entry structure provides an annular rim with second connecting means to interconnect the body and carries radially inwardly extending triangular-like fingers formed of resiliently deformable polymeric material having retentent memory. Pine cones may enter through the entry structure responsive to downwardly directed force on the collection tool but are prevented from exiting to be collected in the body channel for mass disposition.

11 Claims, 4 Drawing Sheets

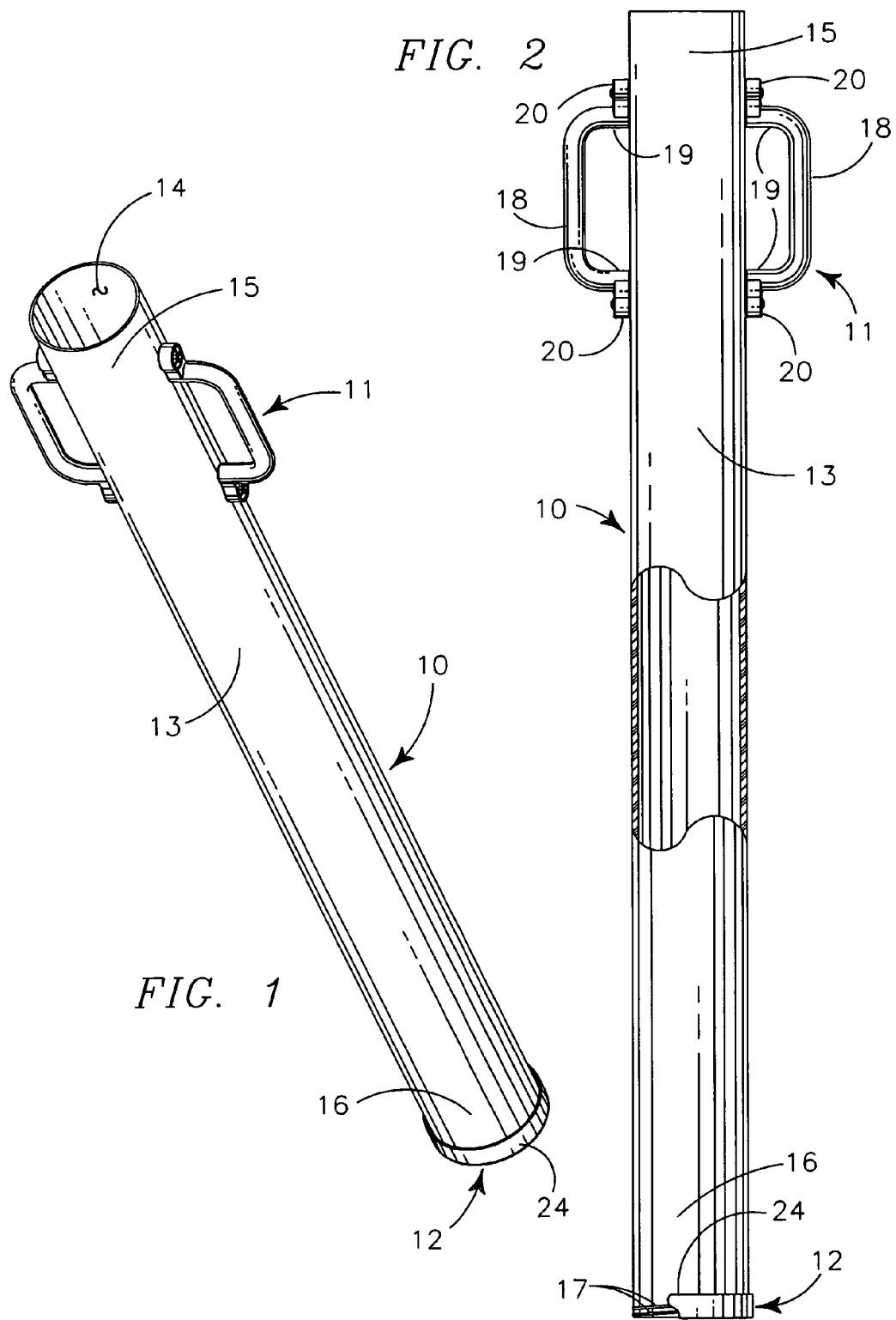

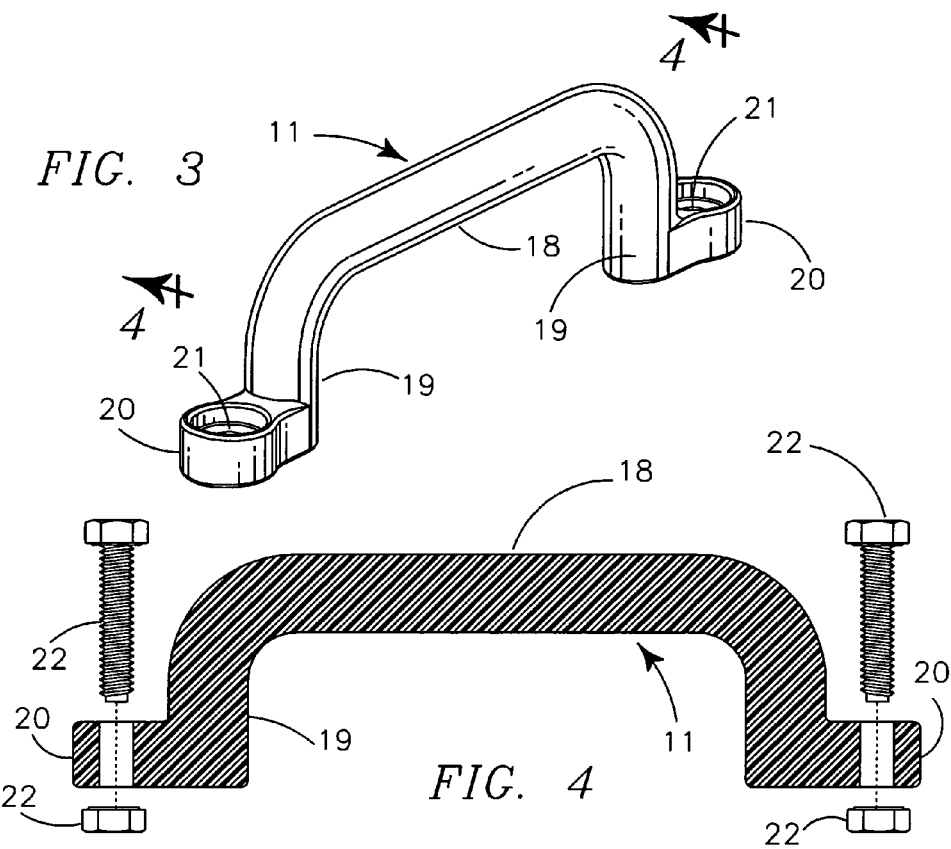
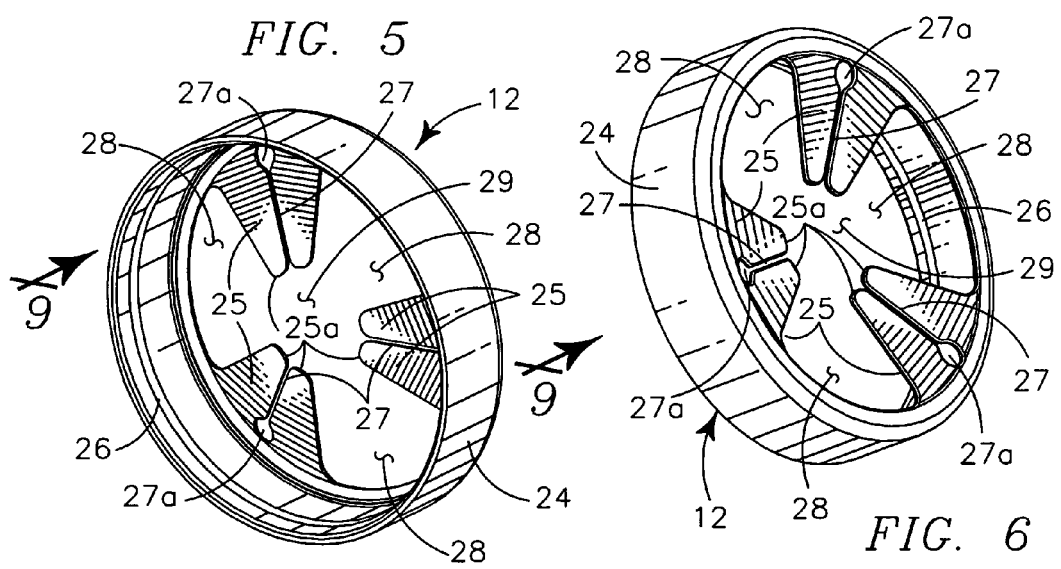

PINE CONE COLLECTION TOOL

RELATED APPLICATIONS

This is a continuation-in-part of an application Ser. No. 10/826,629 filed Apr. 15, 2004 now abandoned.

BACKGROUND OF INVENTION

1. Field of Invention

This invention relates generally to receptacles with means to gather and store a product and more particularly to a tubular receptacle having a resiliently deformable entry structure at its lower end to allow ingress of pine cones therethrough and prevent egress of the pine cones therethrough.

2. Background and Description of Prior Art

Coniferous trees of the order Coniferales are widely distributed especially through the temperate zones of the earth and such plants are often used for ornamentation and landscaping in cultivated habitable areas. These plants in their ordinary life cycle drop cones during a substantial portion of each calendar year and in general it is desired that these cones be collected and removed from cultivated areas both by reason of the aesthetics involved and the impediments that such cones present to future cultivation if they remain in place. In general in smaller areas such cones heretofore have been collected for removal by manual means of collection such as directly with the collector's hands or sometimes as aided by tools such as a rake to bring a plurality of such cones into a collection area where the plurality may be picked up by hand or moved into a container. In larger areas fallen pine cones have sometimes been collected by use of mechanical devices such a mechanized rakes, rotary brushes or the like. Mechanized devices, however, are sufficiently costly to make them economically infeasible for the owners of smaller parcels of property and often such mechanisms are not operative within the physical bounds, about obstacles and over topographic features often present in such parcels.

The instant invention provides a hand manipulable tool, of simple and economic construction for use in picking up and storing a plurality of fallen pine cones, that may be operated by a user while maintaining a standing position and without direct manual contact with the pine cones.

Pine cones comprise a plurality of ovule-bearing or pollen-bearing scales or bracts in trees of the pine family (genus *Pinus* of the Pinaceae family) or in cycads (family Cycadacene). The size and configuration of pine cones vary widely with major dimensions ranging upwardly to twelve inches or more and minor dimensions, especially in smaller cones, often approaching the major dimensions to produce configurations ranging from a near spherical-like shape ranging through oblate spheroids to elongate curvilinear conic-like shapes. Pine cones also vary widely in both density and rigidity and all of these attributes commonly change through different periods of the cone life cycle, whether a cone is attached to a tree or has fallen therefrom. For a tool to be useful in collecting pine cones and have economic viability for use throughout the United States, the tool must be usable with a wide variety of cones of varying physical attributes there present.

The scales and bracts of pine cones are commonly quite hard and rigid when and after the cones have dropped and the configuration of many bracteal types is somewhat triangular with the triangle apex extending outwardly and terminating in a sharp thorn-like end. By reason of this structure it is desirable that a tool for pine cone collection operate in a fashion that does not require direct manual contact or manipulation of the cone by a user to prevent injury and discomfort.

It is further desirable that a pine cone collection tool provide a containment structure wherein a plurality of collected pine cones may be accumulated and stored before having to empty the tool for further use. For practical usability the containment chamber must also be easily accessible and manipulable to allow emptying of stored pine cones preferably without any manual contact by a user.

Heretofore various hand tools designed and used primarily for purposes other than the collection of pine cones have been used or indicated as usable for pine cone collection, but it is not known that any tools heretofore known have been specially designed for pine cone collection. Long handled tools of a grasping type having jaws pivotally movable toward and away from each other have been used for pine cone collection but those tools do not necessarily well grasp a pine cone, are not easily manipulable to so do and do not provide means for storing a plurality of collected pine cones for deposition at a future time. Various sweeping or raking type hand tools have been used to amass a plurality of pine cones for collection but these tools provide no storage facility for collected cones and often require the user to move from a standing position to place amassed cones in a storage or transport member. Various tube or chamber type devices having an orifice structure that passes objects only for ingress and prevent egress of contained objects have heretofore been known, but in general such devices have been designed for specific objects generally having uniform predeterminable size and configuration such as collection devices for golf balls, tennis balls, baseballs, nuts and the like. These devices have often allowed operation without a user moving from a standing posture but they are not usefully operable to pick up pine cones of substantially varying shapes and sizes as such devices generally have no means for picking up variously sized and configured objects such as pine cones. If pine cones should pass into their storage elements there generally is no means to surely prevent their egress.

The instant invention seeks to resolve these problems by providing an elongate tubular tool with a particular specialized entry structure about its lower orifice providing a releasably attachable annulus supporting plural radially inwardly extending circumferentially spaced finger elements that are formed of resiliently deformable sheet material that has a retentent memory operative quite rapidly to return the finger elements to the normal null configuration after deformation. The finger elements may have a slightly arcuate axially inward angulation to aid in maintaining a pine cone beneath the entry structure for and during collection. Both any angulation of the entry structure and the peripheral shape of split finger elements operate synergistically during the collecting process aid in moving a pine cone into a position relative to the entry structure that provides a higher probability of entry of the pine cone through the entry structure and its retention in the tool than entry and retaining structures of known devices used to collect objects of predetermined similar size and configuration.

Our invention does not reside in any one of the these features individually but rather in the synergistic combination of all of the structures of our tool that necessarily give rise to the functions flowing therefrom as hereinafter specified and claimed.

SUMMARY OF INVENTION

Our tool generally provides a rigid cylindrically tubular body having a first upper end and second lower end defining first fastening means. The upper outer portion of the body spacedly below its upper orifice preferably carries one or more manipulating handles to aid manual manipulation and carriage of the tool. The second lower end portion of the body carries an entry structure comprising a cap-like member having an annular peripheral rim defining second connecting means to releasably interconnect the entry structure with the first connecting means of the lower end portion of the body. The peripheral rim structurally carries preferably three radially inwardly extending split finger elements of substantial area that extend inwardly to points spacedly adjacent from the axis of the peripheral rim to leave a void about the inner end portions of the fingers that communicates with slots between the fingers. The finger elements are formed of resiliently deformable sheet material having a retentent memory that operates within a relatively short period of time, such as particular polymeric or resinous plastic of modern day commerce.

In operation the assembled tool in substantially vertical orientation is positioned over a loose ground supported pine cone to be collected with the pine cone immediately beneath the lower surface of the entry structure. Force is applied by the user to move the tool downwardly upon and over the subject pine cone. As this occurs the entry structure fingers will deform upwardly toward the tool body to cause the subject pine cone to pass upwardly through the entry structure and into the tool body channel. Upon such passage the split fingers will assume their previously existing null position by reason of their retentent memory. A plurality of pine cones may be collected in similar fashion with later collected pine cones displacing previously collected pine cones upwardly within the chamber defined by the body to ultimately allow dumping through the orifice at the open upper end of the body by appropriate manipulation of the tool by the user.

In providing such a device it is:

a principal object is to provide a pine cone collection tool specifically designed to allow collection of pine cones of a wide range of sizes and shapes.

A further object is to provide such a tool with an elongate tubular body of sufficient length that the tool may be manipulated manually by a user to collect pine cones while the user remains in a standing posture.

A further object is to provide such a tool having an open upper channel orifice that permits simple and easy dumping of pine cones contained in the body channel by tipping the tool with its normally upper end downwardly over a desired deposition site to allow removal of contained cones by action of gravity.

A further object is to provide such a tool having a releasably carried entry structure at the lower end of the body that partially covers the lower entrance of the body to allow ingress of pine cones through the entry structure and into the body channel but prevents egress of cones carried in the body channel back through the entry structure.

A still further object is to provide such entry structure having a peripheral annulus with preferably three circumferentially spaced split finger elements of substantial area extending radially inwardly therefrom to positions spacedly adjacent from each other to define a central void between the finger element ends that communicates with slots in and between the finger elements.

A further object is to form such finger elements of resiliently deformable sheet material having quickly acting retentent memory so that the finger elements may be deformed to allow ingress of pine cones therethrough and into the body channel by reason of resilient deformation but prevent egress of the pine cones from the body channel outwardly through the finger elements by reason of the retentent memory.

A still further object is to provide such entry structure wherein the resilient finger elements may be angulated axially inward relative to the lower end of the tubular body to aid in positioning and maintaining a pine cone beneath the entry structure and in moving the pine cone into the tool body channel.

A still further object is to provide such a tool that is of new and novel design, of rugged and durable nature, of simple and economic manufacture and one that is otherwise well suited to the uses and purposes for which it is intended.

Other and further objects of our invention will appear from the following specification and accompanying drawings which form a part hereof. In carrying out the objects of the invention, however, it is be understood that its features are susceptible to change in design and structural arrangement with only one preferred and practical embodiment being illustrated in the accompanying drawings as is required.

DESCRIPTION OF DRAWINGS

In the accompanying drawings which form a part hereof and wherein like numbers of reference refer to similar parts throughout:

FIG. 1 is an isometric front and right side view of our pine cone collection tool.

FIG. 2 is an enlarged partially cutaway orthographic front elevational view of the tool of FIG. 1.

FIG. 3 is an enlarged isometric view of one of the manipulating handles of the tool of FIG. 1.

FIG. 4 is a medial cross-sectional view of the handle of FIG. 3, taken on the line 4-4 thereon in the direction indicated by the arrows.

FIG. 5 is an isometric view of the entry structure of the tool of FIG. 1 having coplanar entry fingers, taken from the inside looking in an outward direction.

FIG. 6 is an isometric view of the entry structure of the tool of FIG. 1 having inwardly angulated entry fingers, looking inwardly toward the tool body.

DESCRIPTION OF THE PREFERRED EMBODIMENT

Figure 7:
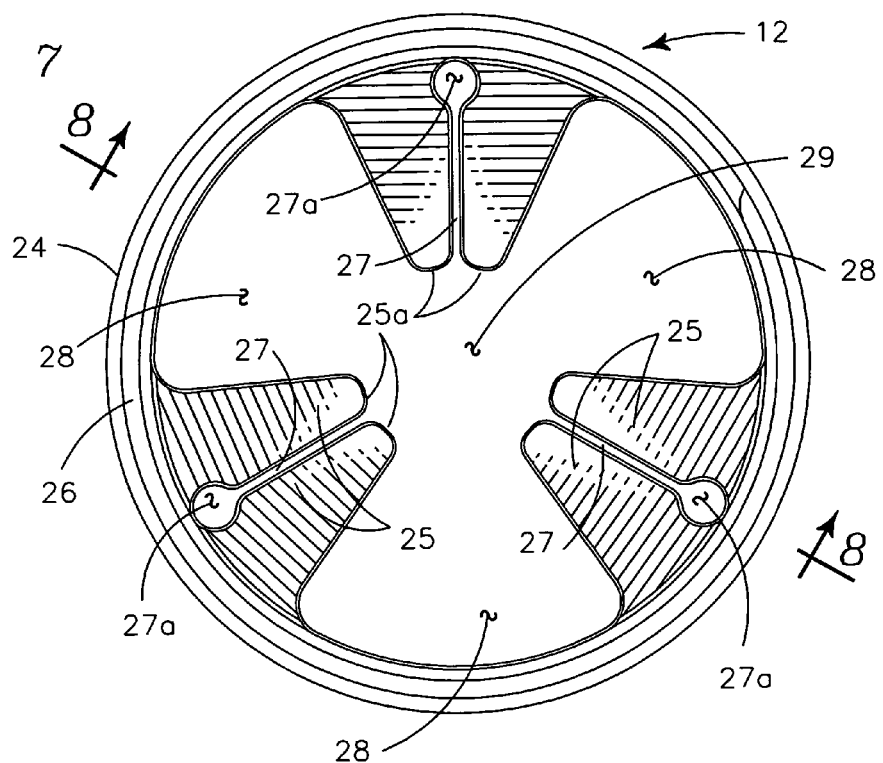
FIG. 7 is an enlarged orthographic bottom view of the entry structure of FIG. 6.

Our pine cone collection tool generally comprises elongate tubular body 10 carrying at least one manipulating handle 11 axially inwardly from its upper end and releasably carrying cap-like entry structure 12 at its lower end.

Body 10 provides elongate right circular cylindrical tube 13 defining medial channel 14 extending from upper end portion 15 to lower end portion 16. The lower end portion 16 of tube 13 defines fastening means 17 in the instance illustrated in FIG. 2 comprising external threads to cooperate with fastening means defined by entry structure 12 to positionally maintain the entry structure 12 on the lower end portion of cylindrical body tube 13, preferably in a releasable type interconnection.

Cylindrical tube 13 is formed of rigid durable material that is of light weight to aid manipulation of the tool, preferably such as polymeric or resinous plastic. For use with a maximum number of pine cones of conifers prevalent in the United States the cylindrical tube 13 should have a relatively thin circumferential wall with an external diameter of approximately five inches and a length varying from approximately thirty-six to forty-eight inches. This preferred configuration is not essential to the operability of the tool and may vary to accommodate particular conditions of use, size of pine cones and physical characteristics of users.

Manipulating handles 11 illustrated in FIGS. 3 and 4 are two in number and of a common U-shaped off set type. The handles 11 provide grasping back 18 perpendicularly projecting legs 19 each having fastening brackets 20 extending perpendicularly from the outer end portion of each leg 19. In the instance illustrated each fastening bracket defines medial hole 21 to receive nut/bolt fastener 22 therethrough to attach the handles to cylindrical tube 13. Spacedly opposed pairs of fastening holes (not shown) are defined in cylindrical tube 13 inwardly adjacent upper end portion 15 of the cylindrical tube 13 with the same spacing as holes 21 in fastening brackets 20 of the manipulating handles 11 to allow releasable fastening of those handles 11 by fasteners 22 in vertical orientation and diametrically opposed positions on the upper end portion 15 of cylindrical tube 13, as illustrated in FIGS. 1 and 2.

The particular manipulating handle structures illustrated are not essential to the operation of our tool but do make tool operation and manipulation more easy. Various other known types of handles may be substituted for use with the tool and the handles may have varying orientation and positioning in the upper part of the tool. The tool is operative without any handle structures at all but in that configuration the tool may not be as easily manipulated and used as in a configuration providing handles.

Entry structure 12 is a cap-like member formed by circularly annular peripheral rim 24 structurally carrying radially inwardly extending fingers 25. The inner surface of rim 24 has a diameter slighter greater than the outer diameter of cylindrical tube 13 so that the rim may fit over and about the lower end portion 16 of the cylindrical tube 13 to allow fastening without narrowing the internal diameter of medial channel 14 of the cylindrical tube 13. The upper inner surface of rim 24 defines fastening means 26, in the instance illustrated comprising external threads, to releasably fastenably interconnect with fastening means 17 comprising internal threads defined by lower end portion 16 of cylindrical tube 13.

Fingers 25 in the instance illustrated in FIGS. 5-8 are three in number and formed of flat sheet material to a somewhat truncated triangular configuration with corners and edges filleted as illustrated. Each finger 25 is equally spaced about the inner circumferential periphery of rim 24 and is structurally supported thereby. Structural support may be created by reason of unitary formation of the fingers and rim or known structural joinder methods for the materials involved. If desired, the fingers may be joined by a separate finger rim (not shown) so that they may be removably attached to rim 24 to allow replacement without replacing the entire annular peripheral rim if desired.

Each finger defines a radially oriented medial slot 27 that in its radially outer end portion terminates in bulbous enlargement 27a to allow more flexibility of each opposed portion of the fingers 25 and prevent breakage and cracking of the finger material in its radially outer portion. The fingers 25 are configured and circumferentially spaced about rim 24 such that the circumferential space between fingers 25 is at least equal to or greater than the circumferential space occupied by the base of each finger 25 at the line of its attachment to rim 24 to create somewhat angularly shaped spaces 28 between each finger. The radial extension of inner end portions 25a of each finger is spacedly distant from the center of rim 24 and from each other finger 25 to create a medial space 29 between inner ends 25a of fingers 25. With this structure the spaces 28 between fingers 25 and the medial space 29 between the end portions 25a of the fingers join with each other to form a clover leaf type orifice 28,29 within the inner periphery of rim 24.

Figure 8:
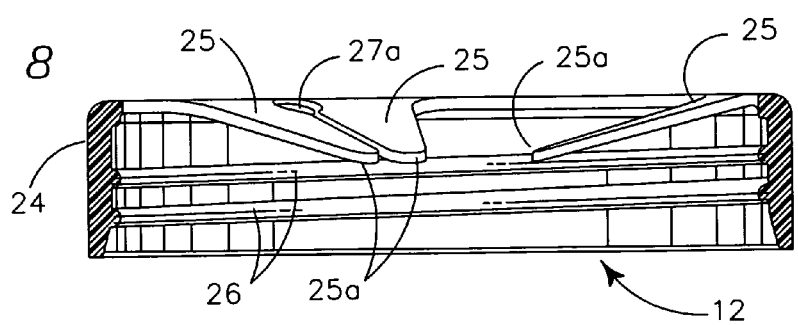
FIG. 8 is a diametrical cross-sectional view through the entry structure of FIG. 7, taken on the line 8-8 thereon in the direction indicated by the arrows.
Figure 9:
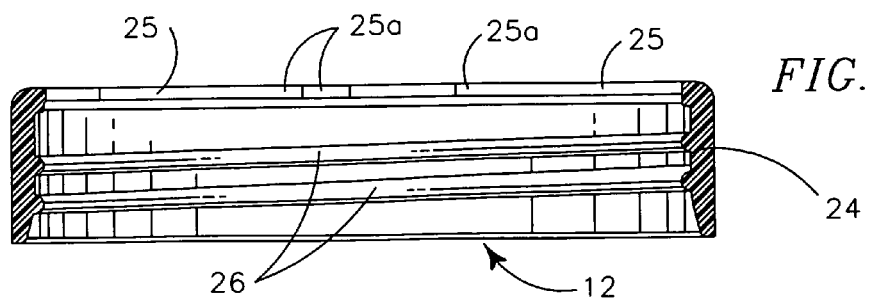
FIG. 9 is an enlarged diametrical cross-sectional view through the entry structure of FIG. 5, taken on the line 9-9 thereon in the direction indicated by the arrows.

The fingers 25 may be coplanar (not illustrated) in a plane that is perpendicular to the axis of rim 24 and body 10 or preferably the fingers 25 may be somewhat angulated in a direction toward body 10 when rim 24 is in fastened position thereon, as shown in the cross-sectional view of FIG. 8. If fingers 25 are angulated, this creates an indentation in the medial portion of the entry structure which makes it easier for a user to center a pine cone to be operated upon beneath the orifice 28,29 and also makes it easier to manipulate the tool to cause a pine cone to enter through the orifice 28, 29. If the fingers 25 are angulated the angulation may not be too great, preferably not more than ten to fifteen degrees, or the angulation may hinder the operation of the tool in picking up a pine cone beneath the entry structure by causing downward force on body 10 as hereafter described.

Fingers 25 must be formed of some resiliently deformable material having a retentent memory such as to be operative in a reasonably short period of time to return the fingers 25 to their null mode after deformation. The material of preference is a polymeric or resinous plastic in the form of sheet material that may be configured as hereinbefore specified. Common plastics such as polyethylene, polypropylene and polyurethane are suitable to fulfill this purpose. The configuration of the fingers 25, both as to periphery and thickness, may have to be somewhat regulated to a particular plastic to produce the desired functions of the entry structure 12. It is possible that the fingers 25 could be formed from quite thin sheet metal of sufficient elasticity, such as stainless steel and that material is within the ambit and scope of our invention, though it has not been found to be as useful and practical as polymeric material.

For effective use in picking up pine cones it has been found by experimentation that only a single layer of fingers may be used and that those fingers must have appropriate deformability and some substantial surface are in a horizontal plane, the fingers become entangled in the structure of a pine cone attempted to be passed therethrough to such a degree as to prevent the passage or make it quite problematic because of the entanglement. The stiffness of the fingers in their radial portions also is critical for proper operation of the fingers. It has been found that the finger shape illustrated, with substantial area in a horizontal plane and a radially inwardly tapering body with a medial slit, provides the greatest flexibility for control of finger resilient deformability and retention memory in the various finger portions to prevent entanglement of pine cones in the entry structure. Entry structures for tools to pick up articles having at least two or more somewhat parallel spacedly opposed elastically deformable elements or multiple layers of somewhat radially oriented elastically deformable elements have been found not to be effective in picking up pine cones because such entry structures become entangled with the pine cone structure to such a degree as to prevent entry of pine cones therethrough to make them unreliable.

Having described the structure of our cone collection tool its use may be understood.

Figure 10:
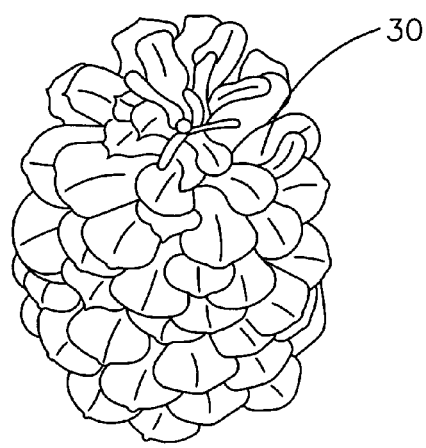
FIG. 10 is an isometric view of a typical pine cone which may be collected by our tool.
Figure 11:
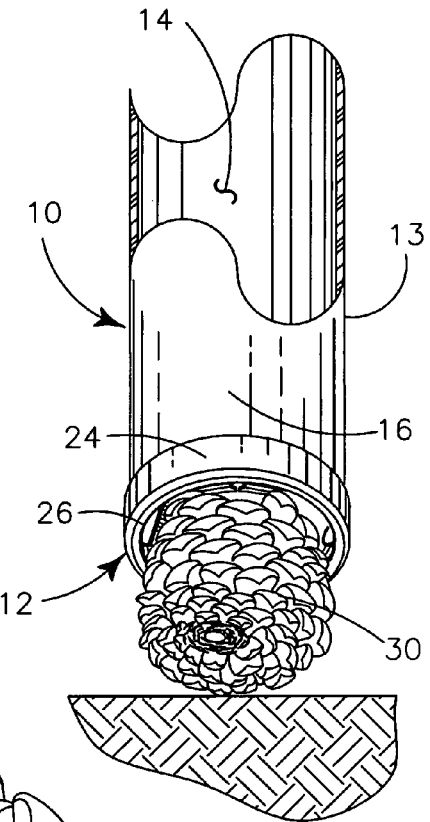
FIG. 11 is a partial isometric view of a ground supported pine cone entering the instant collection tool.
Figure 12:
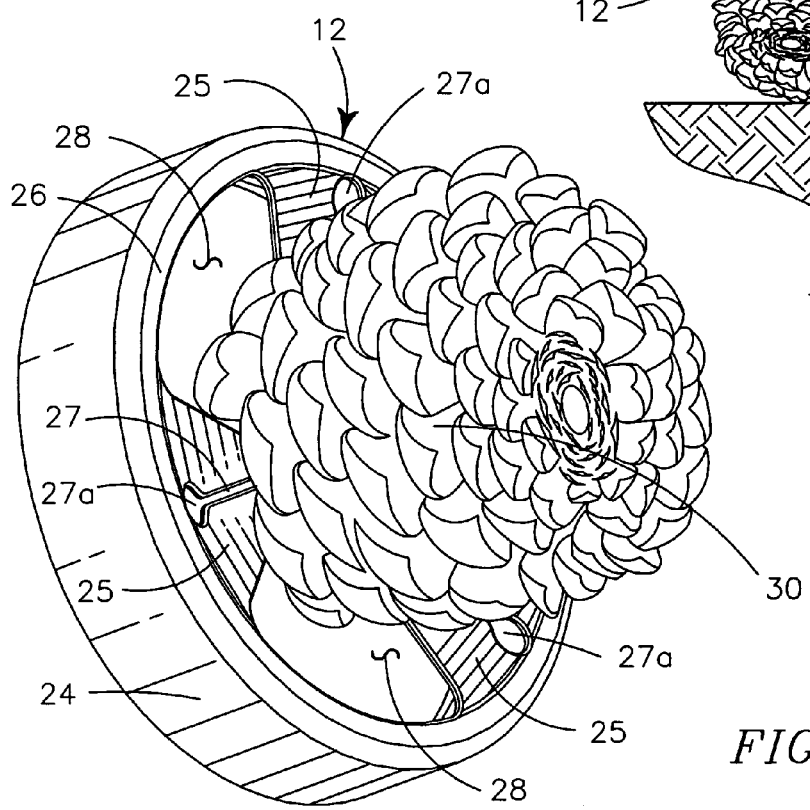
FIG. 12 is an enlarged isometric view of the pine cone of FIG. 11 passing into and partially through the entry structure of the pine cone collection tool.

A tool is formed according the foregoing specification and manually moved to the location of a pine cone 30 (FIG. 10) to be collected. The tool is placed with the entry structure 12 resting on and immediately above the subject pine cone 30. The tool then is grasped usually by manipulating handles 11, and forced downwardly until the lower edge of annular peripheral rim 24 rests on the surface supporting the subject pine cone 30. As the entry structure 12 moves downwardly relative to the pine cone 30 therebeneath, portions of the fingers 25 will be deformed by the pine cone 30 and the cone 30 will ultimately pass upwardly through the orifice defined by spaces 28,29 to move into medial channel 14 of body 10. As the pine cone 30 moves through the entry structure 12, the fingers 25 of entry structure 12, by reason of retentent memory, will return to their null state that existed before deformation, the pine cone 30 will be retained in channel 14 above entry structure 12 and the tool will be ready for a second similar pine cone 30 collecting operation as described.

The collected pine cone 30 in medial channel 14 of the cylindrical tube 13 will be retained within the tube channel 14 because gravity forces acting upon the pine cone 30 are not sufficient to allow the contained pine cone 30 to deform fingers 25 to move downwardly therepast and the force of gravity acting upon all pine cones 30 in the body channel 14 is not sufficient to cause such action by reason of the rigidity of fingers 25.

The pine cone 30 collecting process then is continued in a similar fashion until a quantity of pine cones 30 is carried within medial channel 14 of the body 10. At this point when the collecting operation has been completed or the body 10 reasonably filled with pine cones 30, the tool is manually moved to a disposition sight spacedly above the area where pine cones 30 are to be deposited. The tool is manually manipulated to turn it upside-down and the pine cones 30 carried in medial channel 14 of the body 10 will move by action of gravity outwardly from the open upper end portion 15 of body 10 and be deposited somewhat vertically therebelow.

In using the instant tool it is to be noted that both the tool and a pine cone 30 to be collected thereby may easily be moved relative to each other to better position the pine cone 30 in a loading position or to better accomplish the passage of the pine cone 30 through the entry structure 12 and into the tool body 10. This movement, the entire loading operation and the unloading operation may be accomplished by the user while in a standing position and without any manual contact with the pine cones 30 in the entire collection and disposition process.

The foregoing description of our invention is necessarily of a detailed nature so that a specific embodiment of its best known mode may be set forth as required, but it is to be understood that various modifications of detail, rearrangement and multiplication of parts might be resorted to without departing from its spirit, essence or scope.

Having thusly described our invention, what we desire to protect by letters patent and

What we claim is:

1. A pine cone collecting and holding tool comprising in combination:
    an elongate tubular body defining a medial channel having a central axis, having an upper end portion opening to said medial channel and a lower end portion opening to said medial channel and defining first fastening means in the lower end portion; and
    an entry structure having an annular peripheral rim defining an orifice geometrically similar to and larger than the lower end portion of the tubular body to fit over the lower portion of the tubular body, said peripheral rim:
    defining second fastening means to releasably interconnect with the first fastening means of the body for releasable positional maintenance of the peripheral rim onto the body, and
    at least two resiliently deformable triangular-like fingers having a wide end integral with the peripheral rim and a narrow end carried in substantially coplanar relationship about the inner surface of the annular peripheral rim of the entry structure, said at least two fingers
        extending radially inwardly from the annular peripheral rim spacedly distant from each other to define an orifice about and between inner ends of the at least two fingers,
        each having converging edges having upper and lower faces spanning across the converging edges in an arc about the central axis,
        each having a predetermined dimension at the wide end, the wide end of each finger being spaced from an adjacent finger by a distance at least as great as the predetermined dimension,
        each having sufficient resilient deformability to allow passage of pine cones therepast upon deformation of at least a portion of at least one of said fingers responsive to force exerted upon the at least one finger by a pine cone and
        each having sufficient retentent memory to return after removal of the deforming force to substantially the same configuration as existed prior to deformation.

2. The tool of claim 1 wherein the body and the peripheral rim have circularly cylindrical configurations.

3. The tool of claim 1 further having
    at least one manipulating handle extending radially outwardly from structural interconnection with the body spacedly downwardly from the upper end portion of the body.

4. The tool of claim 1 wherein the wide end of each of said at least two fingers of the entry structure are coplanar.

5. The tool of claim 1 wherein at least one of said at least two fingers of the entry structure is angulated in a radially inward direction, in a relaxed condition of said at least one finger, toward the body at an angle of not more than about fifteen degrees to a plane perpendicular to the central axis of the tubular body.

6. The tool of claim 1 wherein each of the fingers defines a medial radially extending slot terminating in a radially outer portion in a bulbous enlargement to allow radially inner portions of each finger to move substantially independently of each other.

7. The tool of claim 1 formed of one of the plastics of a group containing polyethylene, polyurethane and polypropylene.

8. The tool of claim 1 wherein the first fastening means of the lower end portion of the body comprises external threads and the second fastening means of the rim of the entry structure comprises internal threads that matingly enmesh to releasably interconnect the body and the entry structure.

9. A pine cone collecting and holding tool comprising in combination:
    an elongate circularly cylindrical tubular body having a medial channel having a central axis, an axial length of between thirty-six and forty-eight inches and an external diameter of between four and ten inches, said body having an upper end portion opening to the medial channel and a lower end portion defining first fastening means about an orifice opening to the medial channel;

at least two U-shaped manipulating handles carried in diametrically opposed positions on the body spacedly downwardly from the upper end portion; and entry structure carried on the lower end portion of the body having an annular peripheral rim having a section parallel to the lower end portion of the body and having an internal diameter larger than the external diameter of the lower portion of the body to fit there-over, said annular rim defining second fastening means to releasably fasten with the first fastening means of the lower portion of the body, three circumferentially spaced triangular-like fingers each having a wide radially outer end carried in coplanar relationship by an inner surface of the peripheral rim and a narrow end extending radially inwardly to a position with inner ends spacedly distant from each other, the fingers comprising converging edges having upper and lower faces spanning across the converging edges in an arc about the central axis, the fingers being spaced apart from each other and not overlapping any other fingers, the converging edges being spaced from any other fingers defining gaps between adjacent fingers, each of the fingers formed of resiliently deformable polymeric material having retentent memory and defining a medial slot extending radially outwardly from the inner end portion of each finger to terminate in a bulbous enlargement to allow radially inner end portions of each finger to move relative to each other, each finger having a predetermined dimension at the wide end, the wide end of each finger being spaced from an adjacent finger by a distance at least as least as the predetermined dimension.

10. An article collection and holding tool comprising a tubular body having a passage thereinto providing a central axis and a lower end portion opening to the passage; and an entry structure having an annular peripheral rim providing a section parallel to the lower tubular end portion, the lower tubular end portion and the peripheral rim being in overlapping relation, and at least two resiliently deformable triangular-like fingers having a wide end integral with the peripheral rim and a narrow end extending into the tubular body, the fingers being spaced distant from each other to define an article passage between the fingers, the fingers comprising converging edges having upper and lower faces spanning across the converging edges in an arc around the central axis, the fingers being spaced apart from each other and not overlapping any other fingers, the converging edges being spaced from any other fingers defining gaps between adjacent fingers, each finger having a predetermined dimension at the wide end, the wide end of each finger being spaced from an adjacent finger by a distance at least as great as the predetermined dimension.

11. The tool of claim 10 wherein the fingers extend away from a terminus of the lower tubular end portion toward an intermediate portion of the lower tubular end portion in an undeformed condition of the fingers.

* * * * *